(12) United States Patent
Sasaki et al.

(10) Patent No.: US 12,089,610 B2
(45) Date of Patent: Sep. 17, 2024

(54) OIL AND FAT COMPOSITION

(71) Applicant: KAO CORPORATION, Tokyo (JP)

(72) Inventors: Aya Sasaki, Katsushika-ku (JP); Katsuyoshi Saito, Arakawa-ku (JP)

(73) Assignee: KAO CORPORATION, Tokyo (JP)

( * ) Notice: Subject to any disclaimer, the term of this patent is extended or adjusted under 35 U.S.C. 154(b) by 634 days.

(21) Appl. No.: 17/295,342

(22) PCT Filed: Nov. 19, 2019

(86) PCT No.: PCT/JP2019/045238
§ 371 (c)(1),
(2) Date: May 19, 2021

(87) PCT Pub. No.: WO2020/105623
PCT Pub. Date: May 28, 2020

(65) Prior Publication Data
US 2022/0015383 A1 Jan. 20, 2022

(30) Foreign Application Priority Data
Nov. 20, 2018 (JP) .................................. 2018-217704

(51) Int. Cl.
| A23D 9/007 | (2006.01) |
| A23D 9/06 | (2006.01) |
| A23L 2/60 | (2006.01) |
| C11C 1/10 | (2006.01) |
| C11C 3/02 | (2006.01) |

(52) U.S. Cl.
CPC ............. *A23D 9/007* (2013.01); *A23D 9/06* (2013.01); *A23L 2/60* (2013.01); *C11C 1/10* (2013.01); *C11C 3/02* (2013.01)

(58) Field of Classification Search
CPC ............ A23D 9/00–06; C11C 3/00–14; A23V 2250/18; A23V 2250/182; A23V 2250/186; A23V 2250/1866; A23V 2250/1874–188; A23V 2250/192; A23V 2250/24; A23L 2/60; A23L 27/30; A23L 29/00
USPC ........................................ 426/601, 607, 417
See application file for complete search history.

(56) References Cited

U.S. PATENT DOCUMENTS

| 6,251,460 | B1 * | 6/2001 | Ganguli ................... C11B 3/14 426/601 |
| 6,432,468 | B1 * | 8/2002 | Akimoto ............... C12P 7/6472 435/243 |
| 8,754,126 | B2 | 6/2014 | Lai ......................... A61K 31/05 426/612 |
| 9,392,806 | B2 * | 7/2016 | Homma .................. A23D 9/007 |
| 2003/0054082 | A1 | 3/2003 | Koike et al. |
| 2004/0062847 | A1 * | 4/2004 | Koike ..................... A21D 2/165 426/601 |
| 2004/0156972 | A1 * | 8/2004 | Nishide .................. A23L 27/60 426/601 |
| 2006/0051484 | A1 | 3/2006 | Yamaguchi et al. |
| 2006/0111578 | A1 * | 5/2006 | Arhancet .................. A23L 7/13 554/8 |
| 2007/0148745 | A1 | 6/2007 | Oi Ming et al. |
| 2014/0234520 | A1 | 8/2014 | Homma et al. |
| 2014/0303389 | A1 * | 10/2014 | Crosby ..................... C11C 3/02 435/134 |
| 2016/0166527 | A1 * | 6/2016 | Gambelli ................ A23L 33/12 514/547 |

FOREIGN PATENT DOCUMENTS

| CN | 101505609 A | 8/2009 |
| CN | 103517634 A | 1/2014 |
| CN | 104520416 A | 4/2015 |
| EP | 1 402 784 A1 | 3/2004 |
| JP | 2001-40386 A | 2/2001 |
| JP | 2006-137923 A | 6/2006 |
| JP | 2008-61577 A | 3/2008 |
| JP | 2009-284859 A | 12/2009 |
| JP | 2011-223942 A | 11/2011 |
| JP | 2014-65897 A | 4/2014 |
| JP | 2016-67354 A | 5/2016 |
| JP | 2018-104684 A | 7/2018 |
| WO | WO 03/094633 A1 | 11/2003 |
| WO | WO 2014/077019 A1 | 5/2014 |

OTHER PUBLICATIONS

Yasutoshi et al.; "Consumption of alpha-linolenic acid-enriched diacylglycerol induces increase in dietary fat oxidation compared with alpha-linolenic acid-enriched triacylglycerol: A randomized, double-blind trial"; Nutrition Research vol. 48, pp. 85-92; Dec. 2017; (Year: 2017).*

Heinze et al.; "Oil Perception—Detection Thresholds for Varying Fatty Stimuli and Inter-individual Differences"; Chemical Senses, vol. 42, Issue 7, Sep. 2017, pp. 585-592, https://academic.oup.com/chemse/article/42/7/585/3920671 (Year: 2017).*

Huang et al.; "Chapter Three—Physiology and Therapeutics of the Free Fatty Acid Receptor GPR40"; Progress in Molecular Biology and Translational Science vol. 121, 2014, pp. 67-94 https://www.sciencedirect.com/science/article/abs/pii/B978012800101100003X (Year: 2014).*

Blondeau et al.; "Alpha-Linolenic Acid: An Omega-3 Fatty Acid with Neuroprotective Properties—Ready for Use in the Stroke Clinic?"; BioMed Research International; Feb. 19, 2015; https://www.ncbi.nlm.nih.gov/pmc/articles/PMC4350958/ (Year: 2015).*

(Continued)

*Primary Examiner* — Drew E Becker
*Assistant Examiner* — Austin Parker Taylor
(74) *Attorney, Agent, or Firm* — Oblon, McClelland, Maier & Neustadt, L.L.P.

(57) ABSTRACT

Provided is a fat or oil composition that enhances sweetness. The fat or oil composition includes the following components (A), (B), and (C): (A) 0.10 mass % or more and 1.50 mass % or less of free α-linolenic acid; (B) 0.3 mass % or more and 1.5 mass % or less of α-linolenic acid monoacylglycerol; and (C) 65 mass % or more of diacylglycerols, wherein a content mass ratio of the component (A) to the component (B), [(A)/(B)], is 0.10 or more and 3.00 or less.

17 Claims, No Drawings

(56) References Cited

OTHER PUBLICATIONS

The Nutrition Source; "Types of Fat"; Harvard T.H. Chan School of Public Health; May 5, 2018; https://web.archive.org/web/20180505015802/https://www.hsph.harvard.edu/nutritionsource/what-should-you-eat/fats-and-cholesterol/types-of-fat/ (Year: 2018).*

International Search Report issued Feb. 25, 2020 in PCT/JP2019/045238 filed Nov. 19, 2018, citing documents AS-AT therein, 2 pages.

Saito, S., et al., "Diacylglycerol Enhances the Effects of Alpha-Linolenic Acid Against Visceral Fat: A Double-Blind Randomized Controlled Trial", Obesity, vol. 25, No. 10, 2017, pp. 1667-1675, 10 total pages.

Takei, A., et al., "Effects of Dietary α-Linolenic Acid-rich Diacylglycerol on Body Fat in Man (1): Lowering Effect on Body Fat", J. Oleo Sci., vol. 50, No. 9, 2001, pp. 735-746.

Extended European Search Report issued on Jul. 15, 2022, for European Patent Application No. 19886509.9, citing documents 1, 15-18 and 24-26 therein, 12 pages.

Yasutoshi Ando, et al., "Consumption of alpha-linolenic acid-enriched diacylglycerol induces increase in dietary fat oxidation compared with alpha-linolenic acid-enriched triacylglycerol: A randomized, double-blind trial", Nutrition Research, vol. 48, Oct. 13, 2017, pp. 85-92, XP085305352.

Takaaki Watanabe, et al., "Optimization of reaction conditions for the production of DAG using immobilized 1,3-regiospecific lipase lipozyme RM IM", Journal of the American Oil Chemists' Society, vol. 80, No. 12, Dec. 1, 2003, p. 1201-1207.

Takuya Mori, et al., "Effect of a-linolenic acid-rich diacylglycerol oil on protein kinase C activation in the rat digestive tract and lingual mucosa", Food and Chemical Toxicology, vol. 103, Feb. 24, 2017, pp. 168-173.

* cited by examiner

OIL AND FAT COMPOSITION

FIELD OF THE INVENTION

The present invention relates to a fat or oil composition.

BACKGROUND OF THE INVENTION

A fat or oil is indispensable as a source of supply of energy and biological constituents essential for life support (primary function). In addition to such nutritional function, the fat or oil is also important as a provider of a so-called sensory function (secondary function) of satisfying preferences, such as taste and smell. It is well known that, while the fat or oil itself is generally almost tasteless, addition of the fat or oil into a food enhances palatability of the food.

In an attempt to improve taste and flavor, such as rich taste, of a fat or oil-containing food, there have been conventionally reported, for example, a method involving adding free oleic acid (Patent Document 1) and a method involving adding arachidonic acid and/or an ester form thereof (Patent Document 2). In addition, there is a report of a method involving adding a thermally-treated lecithin-containing fat or oil to a food to enhance its sweetness (Patent Document 3).

However, there is no sufficient investigation about the sweetness-enhancing effect of the fat or oil.

Meanwhile, it is known that α-linolenic acid (C18:3, ALA), which is abundantly contained in linseed and the like, is, when taken up into the body, converted into eicosapentaenoic acid (C20:5) or docosahexaenoic acid (C22:6), both of which have high physiological activity. In recent years, proposals have been made of various functional fats or oils rich in α-linolenic acid (for example, Patent Document 4).
(Patent Document 1) JP-A-2011-223942
(Patent Document 2) WO-A1-2003/094633
(Patent Document 3) JP-A-2016-067354
(Patent Document 4) JP-A-2001-40386

SUMMARY OF THE INVENTION

The present invention provides a fat or oil composition, comprising the following components (A), (B), and (C):
  (A) 0.10 mass % or more and 1.50 mass % or less of free α-linolenic acid;
  (B) 0.3 mass % or more and 1.5 mass % or less of α-linolenic acid monoacylglycerol; and
  (C) 65 mass % or more of diacylglycerols, wherein a content mass ratio of the component (A) to the component (B), [(A)/(B)], is 0.10 or more and 3.00 or less.

DETAILED DESCRIPTION OF THE INVENTION

The present invention relates to the provision of a fat or oil composition that enhances sweetness.

The inventors of the present invention made extensive investigations with attention focused on the glyceride composition and fatty acid kinds of a fat or oil. As a result, the inventors found that, when the fat or oil comprises free α-linolenic acid and a monoacylglycerol comprising α-linolenic acid as its constituent fatty acid within certain ranges, and is rich in diacylglycerols, there is obtained a fat or oil composition that enhances sweetness.

According to the present invention, there is provided a fat or oil composition capable of enhancing sweetness when used in, for example, a food and drink.

A fat or oil composition of the present invention comprises free α-linolenic acid (A) at 0.10 mass % (hereinafter represented simply by "%") or more and 1.50% or less.

The content of the free α-linolenic acid (A) in the fat or oil composition is preferably 0.14% or more, more preferably 0.15% or more, more preferably 0.16% or more, more preferably 0.17% or more, even more preferably 0.20% or more, from the standpoint of a sweetness-enhancing effect, and is preferably 1.00% or less, more preferably 0.90% or less, more preferably 0.80% or less, more preferably 0.50% or less, even more preferably 0.42% or less, from the standpoint of oxidative stability.

The content of the free α-linolenic acid (A) in the fat or oil composition is preferably 0.14% or more and 1.00% or less, more preferably 0.15% or more and 0.90% or less, more preferably 0.16% or more and 0.80% or less, more preferably 0.17% or more and 0.80% or less, even more preferably 0.20% or more and 0.80% or less.

The fat or oil composition of the present invention comprises α-linolenic acid monoacylglycerol (B) at 0.3% or more and 1.5% or less. When the fat or oil composition comprises the component (B) within a certain range together with the component (A), sweetness can be enhanced.

The content of the α-linolenic acid monoacylglycerol (B) in the fat or oil composition is preferably 0.4% or more, more preferably 0.5° or more, even more preferably 0.6° or more, from the standpoint of a sweetness-enhancing effect, and is preferably 1.2% or less, more preferably 1.0% or less, even more preferably 0.8% or less, from the standpoint of suppressing the deterioration of taste and flavor.

The content of the α-linolenic acid monoacylglycerol (B) in the fat or oil composition is preferably 0.4% or more and 1.2% or less, more preferably 0.5% or more and 1.0% or less, more preferably 0.5% or more and 0.8% or less, even more preferably 0.6% or more and 0.8% or less.

In the present invention, the content mass ratio of the component (A) to the component (B), [(A)/(B)], in the fat or oil composition is 0.10 or more and 3.00 or less. Such content mass ratio is preferably 0.15 or more, more preferably 0.18 or more, even more preferably 0.20 or more, from the standpoint of a sweetness-enhancing effect, and is preferably 1.50 or less, more preferably 1.00 or less, even more preferably 0.80 or less, from the standpoint of suppressing the deterioration of taste and flavor.

The content mass ratio of the component (A) to the component (B), [(A)/(B)], in the fat or oil composition is preferably 0.15 or more and 1.50 or less, more preferably 0.18 or more and 1.00 or less, even more preferably 0.20 or more and 0.80 or less.

The components (A) and (B) may be analyzed by methods described in Examples to be described later.

The kind of a fat or oil that may be used in the fat or oil composition of the present invention is not particularly limited, and any fat or oil that is usable as an edible fat or oil may be adopted. For example, one kind or two or more kinds selected from the following fats or oils may be used: plant-derived fats or oils, such as soybean oil, rapeseed oil, safflower oil, rice oil, corn oil, sunflower oil, cotton seed oil, olive oil, sesame oil, peanut oil, Job's tears seed oil, wheat germ oil, Japanese basil oil, linseed oil, perilla oil, chia seed oil, sacha inchi oil, walnut oil, kiwi seed oil, salvia seed oil, grape seed oil, macadamia nut oil, hazelnut oil, pumpkin seed oil, camellia oil, tea seed oil, borage oil, palm oil, palm olein, palm stearin, coconut oil, palm kernel oil, cacao butter, sal butter, shea butter, and algae oil; animal-derived fats or oils, such as fish oil, seal oil, lard, beef tallow, and butter fat; and transesterified oils, hydrogenated oils, and fractionated oils thereof. It is preferred that the edible fat or oil be a refined fat or oil subjected to a refining process.

Of those, from the standpoint of usability, a plant-derived fat or oil is preferably used, and a liquid fat or oil excellent in low-temperature resistance is more preferably used. The liquid fat or oil means a fat or oil that is in a liquid state at 20° C., when determined in accordance with a cold test described in Standard Methods for Analysis of Fats, Oils and Related Materials 2.3.8-27.

Further, in the present invention, it is preferred to use a fat or oil rich in α-linolenic acid, which is expected to exhibit various physiological functions, for example, one kind or two or more kinds of fats or oils selected from Japanese basil oil, linseed oil, perilla oil, chia seed oil, and sacha inchi oil. That is, the fat or oil composition of the present invention is preferably rich in α-linolenic acid among the constituent fatty acids of the fat or oil.

The content of α-linolenic acid in the constituent fatty acids of the fat or oil is preferably 40% or more, more preferably 45% or more, more preferably 50% or more, even more preferably 52% or more, from the standpoint of physiological effects. In addition, from the standpoint of oxidative stability, the content of α-linolenic acid in the constituent fatty acids of the fat or oil is preferably 80% or less, more preferably 70% or less, more preferably 65% or less, even more preferably 60% or less.

The content of α-linolenic acid in the constituent fatty acids of the fat or oil is preferably 40% or more and 85% or less, more preferably 45% or more and 70% or less, more preferably 50% or more and 70% or less, more preferably 50% or more and 65% or less, even more preferably 52% or more and 60% or less.

In the present invention, the constituent fatty acids of the fat or oil other than α-linolenic acid are not particularly limited, and may be any of saturated fatty acids and unsaturated fatty acids.

From the standpoints of the taste and flavor and industrial productivity of the fat or oil, the total content of the unsaturated fatty acids in the constituent fatty acids of the fat or oil is preferably 50% or more and 100% or less, more preferably 55% or more and 99% or less, even more preferably 60% or more and 98% or less. The carbon numbers of the unsaturated fatty acids are preferably from 14 to 24, more preferably from 16 to 22, from the standpoint of physiological effects.

In addition, the total content of the saturated fatty acids in the constituent fatty acids of the fat or oil is preferably 40% or less, more preferably 30% or less, even more preferably 20% or less, and preferably 0.5% or more, from the standpoints of appearance, physiological effects, and the industrial productivity of the fat or oil. The carbon numbers of the saturated fatty acids are preferably from 14 to 24, more preferably from 16 to 22.

In the present invention, the content of the fat or oil in the fat or oil composition is preferably 90% or more, more preferably 95% or more, and preferably 99.9% or less, from the standpoint of usability. Herein, free fatty acids are not included in the calculation of the content of the fat or oil.

In the present invention, constituent substances of the fat or oil include not only monoacylglycerols but also diacylglycerols and triacylglycerols. In the present invention, the fat or oil includes one or more kinds selected from monoacylglycerols, diacylglycerols, and triacylglycerols.

In the present invention, as the concentration of the diacylglycerols in the fat or oil composition becomes higher, its sweetness-enhancing effect increases. Accordingly, the present invention is preferably applied to a fat or oil rich in diacylglycerols.

The content of the diacylglycerols (C) in the fat or oil composition is 65% or more. The content of the diacylglycerols in the fat or oil composition is preferably 70° or more, more preferably 75% or more, even more preferably 80% or more, and preferably 96% or less, more preferably 95% or less, even more preferably 94% or less, from the standpoint of a sweetness-enhancing effect and the standpoint of physiological effects.

The content of the diacylglycerols in the fat or oil composition is preferably 70% or more and 96% or less, more preferably 75% or more and 95% or less, even more preferably 80% or more and 94% or less.

In addition, in the present invention, from the standpoint of the industrial productivity of the fat or oil, the content of triacylglycerols in the fat or oil composition is preferably 1% or more, more preferably 2% or more, even more preferably 5% or more, and preferably 33% or less, more preferably 30% or less, more preferably 25% or less.

The content of monoacylglycerols in the fat or oil composition is preferably 3% or less, more preferably 2% or less, even more preferably 1.5% or less, from the standpoints of taste and flavor, and the industrial productivity of the fat or oil.

The content of a free fatty acid or a salt thereof in the fat or oil composition is preferably 3% or less, more preferably 2% or less, even more preferably 1% or less, and preferably more than 0%, from the standpoint of taste and flavor.

The fat or oil composition of the present invention preferably further comprises an antioxidant from the standpoint of oxidative stability.

The content of the antioxidant in the fat or oil composition is preferably 0.005% or more and 1% or less, more preferably 0.04% or more and 0.6% or less, even more preferably 0.08% or more and 0.3% or less, from the standpoints of, for example, taste and flavor, oxidative stability, and the suppression of coloring.

The antioxidant is not particularly limited as long as the antioxidant is used in food, and is preferably at least one kind selected from, for example, a natural antioxidant, lecithin, tocopherol, ascorbyl palmitate, ascorbyl stearate, dibutylhydroxytoluene (BHT), and butylated hydroxyanisole (BHA).

It is preferred, from the standpoint of a sweetness-enhancing effect, the standpoint of oxidative stability, and the standpoint of suppressing the deterioration of taste and flavor, that the fat or oil composition of the present invention be a fat or oil composition comprising the following components (A), (B), and (C):
(A) 0.10 mass % or more and 1.00 mass % or less of free α-linolenic acid;
(B) 0.3 mass % or more and 1.2 mass % or less of α-linolenic acid monoacylglycerol; and
(C) 65 mass % or more of diacylglycerols,
wherein the content mass ratio of the component (A) to the component (B), [(A)/(B)], is 0.10 or more and 1.50 or less.

It is preferred, from the standpoint of a sweetness-enhancing effect, the standpoint of oxidative stability, and the standpoint of suppressing the deterioration of taste and flavor, that the fat or oil composition of the present invention be a fat or oil composition comprising the following components (A), (B), and (C):
 (A) 0.10 mass % or more and 0.50 mass % or less of free α-linolenic acid;
 (B) 0.3 mass % or more and 1.0 mass % or less of α-linolenic acid monoacylglycerol; and
 (C) 65 mass % or more of diacylglycerols,
wherein the content mass ratio of the component (A) to the component (B), [(A)/(B)], is 0.15 or more and 1.00 or less.

It is preferred, from the standpoint of a sweetness-enhancing effect, the standpoint of oxidative stability, the standpoint of suppressing the deterioration of taste and flavor, and the standpoint of physiological effects, that the fat or oil composition of the present invention be a fat or oil composition comprising the following components (A), (B), and (C):
 (A) 0.10 mass % or more and 0.50 mass % or less of free α-linolenic acid;
 (B) 0.3 mass % or more and 1.0 mass % or less of α-linolenic acid monoacylglycerol; and
 (C) 65 mass % or more of diacylglycerols, wherein the content mass ratio of the component (A) to the component (B), [(A)/(B)], is 0.15 or more and 1.00 or less, and wherein the content of α-linolenic acid in constituent fatty acids of a fat or oil is 45 mass % or more and 70 mass % or less.

It is preferred, from the standpoint of a sweetness-enhancing effect, the standpoint of oxidative stability, and the standpoint of suppressing the deterioration of taste and flavor, that the fat or oil composition of the present invention be a fat or oil composition comprising the following components (A), (B), and (C):
 (A) 0.14 mass % or more and 0.50 mass % or less of free α-linolenic acid;
 (B) 0.4 mass % or more and 0.8 mass % or less of α-linolenic acid monoacylglycerol; and
 (C) 70 mass % or more of diacylglycerols,
wherein the content mass ratio of the component (A) to the component (B), [(A)/(B)], is 0.18 or more and 0.80 or less.

It is preferred, from the standpoint of a sweetness-enhancing effect, the standpoint of oxidative stability, the standpoint of suppressing the deterioration of taste and flavor, and the standpoint of physiological effects, that the fat or oil composition of the present invention be a fat or oil composition comprising the following components (A), (B), and (C):
 (A) 0.14 mass % or more and 0.50 mass % or less of free α-linolenic acid;
 (B) 0.4 mass % or more and 0.8 mass % or less of α-linolenic acid monoacylglycerol; and
 (C) 70 mass % or more of diacylglycerols,
wherein the content mass ratio of the component (A) to the component (B), [(A)/(B)], is 0.18 or more and 0.80 or less, and wherein the content of α-linolenic acid in constituent fatty acids of a fat or oil is 50 mass % or more and 70 mass % or less.

It is preferred, from the standpoint of a sweetness-enhancing effect, the standpoint of oxidative stability, and the standpoint of suppressing the deterioration of taste and flavor, that the fat or oil composition of the present invention be a fat or oil composition comprising the following components (A), (B), and (C):
 (A) 0.14 mass % or more and 0.42 mass % or less of free α-linolenic acid;
 (B) 0.4 mass % or more and 0.8 mass % or less of α-linolenic acid monoacylglycerol; and
 (C) 75 mass % or more of diacylglycerols,
wherein the content mass ratio of the component (A) to the component (B), [(A)/(B)], is 0.20 or more and 0.80 or less.

It is preferred, from the standpoint of a sweetness-enhancing effect, the standpoint of oxidative stability, the standpoint of suppressing the deterioration of taste and flavor, and the standpoint of physiological effects, that the fat or oil composition of the present invention be a fat or oil composition comprising the following components (A), (B), and (C):
 (A) 0.14 mass % or more and 0.42 mass % or less of free α-linolenic acid;
 (B) 0.4 mass % or more and 0.8 mass % or less of α-linolenic acid monoacylglycerol; and
 (C) 75 mass % or more of diacylglycerols,
wherein the content mass ratio of the component (A) to the component (B), [(A)/(B)], is 0.20 or more and 0.80 or less, and wherein the content of α-linolenic acid in constituent fatty acids of a fat or oil is 50 mass % or more and 65 mass % or less.

It is preferred, from the standpoint of a sweetness-enhancing effect, the standpoint of oxidative stability, and the standpoint of suppressing the deterioration of taste and flavor, that the fat or oil composition of the present invention be a fat or oil composition comprising the following components (A), (B), and (C):
 (A) 0.16 mass % or more and 0.42 mass % or less of free α-linolenic acid;
 (B) 0.5 mass % or more and 0.8 mass % or less of α-linolenic acid monoacylglycerol; and
 (C) 75 mass % or more and 96 mass % or less of diacylglycerols,
wherein the content mass ratio of the component (A) to the component (B), [(A)/(B)], is 0.20 or more and 0.80 or less.

It is preferred, from the standpoint of a sweetness-enhancing effect, the standpoint of oxidative stability, the standpoint of suppressing the deterioration of taste and flavor, and the standpoint of physiological effects, that the fat or oil composition of the present invention be a fat or oil composition comprising the following components (A), (B), and (C):
 (A) 0.16 mass % or more and 0.42 mass % or less of free α-linolenic acid;
 (B) 0.5 mass % or more and 0.8 mass % or less of α-linolenic acid monoacylglycerol; and
 (C) 75 mass % or more and 96 mass % or less of diacylglycerols,
wherein the content mass ratio of the component (A) to the component (B), [(A)/(B)], is 0.20 or more and 0.80 or less, and wherein the content of α-linolenic acid in constituent fatty acids of a fat or oil is 50 mass % or more and 65 mass % or less.

The fat or oil composition of the present invention may be obtained by, for example, appropriately blending edible fats or oils so as to comprise the free α-linolenic acid (A), the α-linolenic acid monoacylglycerol (B), and the diacylglycerols (C) at the above-mentioned contents, or may be obtained by adjusting a reaction step or refinement step for a fat or oil.

As shown in Examples to be described later, the fat or oil composition of the present invention enhances sweetness. Accordingly, the fat or oil composition of the present invention is useful as a sweetness enhancer, and may be used to enhance sweetness.

The fat or oil composition of the present invention may be used in the same manner as a general edible fat or oil, and may be applied to various foods and drinks and feeds each using a fat or oil. Examples of the food and drink to which the fat or oil composition of the present invention may be applied include foods for specified health use and foods with function claims claiming to have the physiological effects of α-linolenic acid and diacylglycerols as well as general foods and drinks.

The form of the food and drink may be a solid, a semisolid, or a liquid, and examples thereof include a drink, a dressing, a water-in-oil type fat or oil-containing food, an oil-in-water type fat or oil-containing food, a bakery food, confectionery, a frozen food, a retort food, and a composition for nutritional supplementation, such as a tablet, a capsule, or a troche. Examples of the feed include: a livestock feed to be used for cattle, swine, or the like; a small-animal feed to be used for rabbits, mice, or the like; a fish and shellfish feed to be used for eels, prawns, or the like; and a pet food to be used for dogs, cats, or the like. The amount of the fat or oil composition to be used in any such food and drink or feed may be appropriately adjusted.

EXAMPLES

[Analysis Method]
(i) Composition of Glycerides in Fat or Oil

About 20 mg of a fat or oil sample and 0.5 mL of a trimethylsilylating agent ("Silylating agent TH," manufactured by Kanto Chemical Co., Inc.) were placed in a glass sample bottle, and the bottle was sealed and heated at 70° C. for 15 minutes. 1.0 mL of water and 1.5 mL of hexane were added thereto, and the bottle was shaken. The bottle was left to stand, and then the upper layer was analyzed by gas-liquid chromatography (GLC).
<GLC Analysis Conditions>
(Conditions)
Apparatus: Agilent 6890 Series (manufactured by Agilent Technologies)
Integrator: ChemStation B 02.01 SR2 (manufactured by Agilent Technologies)
Column: DB-1ht 10 m×0.25 mm×0.2 μm (manufactured by Agilent J&W)
Carrier gas: 1.0 mL He/min
Injector: Split (1:50), T=340° C.
Detector: FID, T=350° C.
Oven temperature: The temperature was increased from 80° C. at 10° C./min to 340° C., and kept for 15 minutes.
(ii) Composition of Constituent Fatty Acids of Fat or Oil Fatty acid methyl esters were prepared in accordance with "Preparation method for fatty acid methyl ester (2.4.1.-1996)" described in "Standard Method for the Analysis of Fats, Oils and Related Materials" edited by Japan Oil Chemists' Society, and the resultant fat or oil samples were subjected to measurement in conformity with American Oil Chemists. Society Official Method Ce 1f-96 (GLC method).

<GLC Analysis Conditions>
Column: CP-SIL88 50 m×0.25 mm×0.2 μm (manufactured by Agilent J&W)
Carrier gas: 1.0 mL He/min
Injector: Split (1:50), T=300° C.
Detector: FID, T=300° C.
Oven temperature: kept at 150° C. for 5 min→increased at 1° C./min→kept at 160° C. for 5 min→increased at 2° C./min→kept at 200° C. for 10 min→increased at 10° C./min→kept at 220° C. for 5 min
(iii) Measurement of Free α-Linolenic Acid and α-Linolenic Acid MAG A sample prepared under the same conditions as in the "(i) Composition of Glycerides in Fat or oil" section was subjected to GLC to be analyzed.
<GLC Analysis Conditions>
Column: CP-TAP CB for Triglycerides 25 m×0.25 mm×0.1 μm (manufactured by Agilent J&W)
Carrier gas: 1.0 mL He/min
Injector: Split (1:20), T=345° C.
Detector: FID, T=355° C.
Oven temperature: kept at 170° C. for 10 min→increased at 10° C./min→kept at 220° C. for 10 min→increased at 10° C./min→kept at 354° C. for 10 min
[Preparation of Raw Material Fats or Oils]
(i) Fat or Oil A Refined rapeseed oil (manufactured by The Nisshin OilliO Group, Ltd.) was used as a fat or oil A.
(ii) Fat or Oil B Fatty acids obtained by hydrolyzing refined linseed oil (manufactured by Summit Oil Mill Co., Ltd.) with an enzyme were winterized to reduce the content of saturated fatty acids. Then, the fractionated fatty acids and glycerin were subjected to an esterification reaction under reduced pressure through use of a commercially available immobilized 1,3-selective lipase as a catalyst. The immobilized enzyme was separated by filtration, and then the product after the completion of the reaction was subjected to molecular distillation to be refined. Thus, a fat or oil B was obtained.
(iii) Fat or Oil C A fat or oil C was obtained by the same method as that for the fat or oil B except that semi-refined linseed oil (manufactured by ADM) was used.
(iv) Fat or Oil D Fatty acids obtained by hydrolyzing refined linseed oil (manufactured by Summit Oil Mill Co., Ltd.) with an enzyme were winterized to reduce the content of saturated fatty acids, followed by filtration, to provide a fat or oil D.
(v) Fat or Oil E Fatty acids obtained by hydrolyzing refined linseed oil (manufactured by Summit Oil Mill Co., Ltd.) with an enzyme were winterized to reduce the content of saturated fatty acids. Then, the fractionated fatty acids and glycerin were subjected to an esterification reaction under reduced pressure through use of a commercially available immobilized 1,3-selective lipase as a catalyst. The immobilized enzyme was separated by filtration, and then the product after the completion of the reaction was subjected to molecular distillation to concentrate monoacylglycerols to a high concentration. Thus, a fat or oil E was obtained.

Analysis values of the fats or oils A to E are shown in Table 1.

TABLE 1

|  | Fatty acid composition (%) | | | | | | Glyceride composition (%) | | | | (A) Free ALA (%) | (B) ALA-MAG (%) |
| --- | --- | --- | --- | --- | --- | --- | --- | --- | --- | --- | --- | --- |
|  | C16:0 | C18:0 | C18:1 | C18:2 | C18:3 | Others | FFA | MAG | DAG | TAG | | |
| Fat or oil A | 3.7 | 1.7 | 62.3 | 19.3 | 9.1 | 3.9 | 0.1 | 0.0 | 1.3 | 98.6 | 0.01 | 0.0 |
| Fat or oil B | 3.3 | 2.0 | 23.0 | 16.6 | 53.4 | 1.7 | 0.1 | 0.6 | 84.1 | 15.2 | 0.05 | 0.3 |
| Fat or oil C | 2.7 | 1.6 | 23.3 | 16.0 | 55.0 | 1.4 | 0.3 | 1.1 | 76.9 | 21.7 | 0.18 | 0.6 |
| Fat or oil D | 2.6 | 1.5 | 23.0 | 16.0 | 55.7 | 1.2 | 93.2 | 0.8 | 3.8 | 2.2 | 51.98 | 0.4 |
| Fat or oil E | 2.7 | 1.4 | 23.8 | 16.8 | 55.1 | 0.2 | 3.4 | 89.5 | 5.8 | 1.3 | 1.85 | 49.3 |

FFA: free fatty acids
MAG: monoacylglycerols
DAG: diacylglycerols
TAG: triacylglycerols
ALA: α-linolenic acid Reference Examples 1 to 3, Examples 1 to 7, and Comparative Examples 1 to 7

[Preparation of Fat or Oil Compositions]

The raw material fats or oils were mixed at ratios shown in Table 2 to prepare respective fat or oil compositions.

[Sweetness Evaluation Test 1]

The fat or oil compositions obtained above were subjected to sensory evaluation. Specifically, in a glass vial (SV-50, manufactured by Nichiden-Rika Glass Co., Ltd.), 1.80 g of sugar and 0.15 g of polyglycerin fatty acid ester (Sunsoft A-141E, manufactured by Taiyo Kagaku Co., Ltd.) were dissolved in 22.05 g of water to prepare an aqueous solution of sugar, and then 6 g of any one of the fat or oil compositions was mixed therewith. Then, the mixture was stirred with ULTRA-TURRAX T25 (manufactured by Yamato Scientific Co., Ltd., 8,000 revolutions, 1 minute) to provide a test sample as an oil-in-water type emulsion containing 6% (w/w) of sugar. Three expert panelists ingested the test sample taken with a plastic dropper, and evaluated its sweetness.

The evaluation was performed by determining a score through discussion by the three expert panelists on a 10-point scale in 1-point increment with a score of "1" representing the sweetness of an oil-in-water type emulsion containing 6% (w/w) of sugar adjusted with rapeseed oil, and a score of "10" representing the sweetness of an oil-in-water type emulsion containing 6.6% (w/w) of sugar (identical to the oil-in-water type emulsion containing 6% (w/w) of sugar except for being prepared from 1.98 g of sugar and 21.87 g of water). The results are shown in Table 2.

TABLE 2

|  | Fat or oil A | Fat or oil B | Fat or oil C | Fat or oil D | Fat or oil E | (A) Free ALA (%) | (B) ALA-MAG (5) | (A)/(B) | (C) DAG (%) | Sweetness evaluation |
| --- | --- | --- | --- | --- | --- | --- | --- | --- | --- | --- |
| Reference Example 1 | 98.7 | — | — | 0.5 | 0.8 | 0.28 | 0.4 | 0.72 | 1.3 | 7 |
| Reference Example 2 | 97.7 | — | — | 0.3 | 2.0 | 0.20 | 1.0 | 0.20 | 1.4 | 6 |
| Reference Example 3 | 98.2 | — | — | 0.2 | 1.6 | 0.14 | 0.8 | 0.18 | 1.3 | 5 |
| Example 1 | — | 99.5 | — | 0.2 | 0.3 | 0.16 | 0.4 | 0.36 | 83.7 | 8 |
| Example 2 | — | 99.2 | — | 0.5 | 0.3 | 0.32 | 0.4 | 0.71 | 83.4 | 8 |
| Example 3 | — | 98.8 | — | 0.2 | 1.0 | 0.17 | 0.8 | 0.22 | 83.1 | 9 |
| Example 4 | — | 98.5 | — | 0.5 | 1.0 | 0.33 | 0.8 | 0.42 | 82.9 | 10 |
| Example 5 | — | — | 100.0 | — | — | 0.18 | 0.6 | 0.30 | 76.9 | 9 |
| Example 6 | — | 98.3 | — | 0.2 | 1.5 | 0.18 | 1.0 | 0.18 | 82.7 | 8 |
| Example 7 | — | 98.8 | — | 0.7 | 0.5 | 0.42 | 0.5 | 0.78 | 83.1 | 9 |
| Comparative Example 1 | 100.0 | — | — | — | — | 0.01 | 0.0 | — | 1.3 | 1 |
| Comparative Example 2 | 99.8 | — | — | 0.2 | — | 0.11 | 0.0 | — | 1.3 | 3 |
| Comparative Example 3 | 98.8 | — | — | — | 1.2 | 0.03 | 0.6 | 0.05 | 1.3 | 3 |
| Comparative Example 4 | 98.0 | — | — | — | 2 | 0.05 | 1.0 | 0.05 | 1.3 | 2 |
| Comparative Example 5 | 99.5 | — | — | 0.1 | 0.4 | 0.07 | 0.2 | 0.35 | 1.3 | 3 |
| Comparative Example 6 | 94.8 | — | — | 0.2 | 5.0 | 0.21 | 2.5 | 0.08 | 1.5 | 1 |
| Comparative Example 7 | — | 100.0 | — | — | — | 0.05 | 0.3 | 0.17 | 84.1 | 3 |

MAG: monoacylglycerols
DAG: diacylglycerols
ALA: α-linolenic acid

[Sweetness Evaluation Test 2]

1 g of the fat or oil composition of Example 5 or Comparative Example 1 obtained above was sprinkled on 50 g of each material, and the sweetness of the resultant was evaluated by three expert panelists on the basis of the following evaluation criteria. A score was determined through discussion by the three expert panelists. The results are shown in Table 3.
- a: The sweetness was enhanced as compared to that of an additive-free sample.
- b: The sweetness was unchanged as compared to that of the additive-free sample.
- c: The sweetness was weakened as compared to that of the additive-free sample.

TABLE 3

|  |  | Example 5 | Comparative Example |
|---|---|---|---|
| Warm vegetable | Potato | a | b |
|  | Carrot | a | b |
|  | Pumpkin | a | b |
| Chocolate |  | a | b |

As apparent from Table 2, the fat or oil compositions of Examples 1 to 7 showed strong sweetness as compared to the sweetness of the oil-in-water type emulsion containing 6% (w/w) of sugar adjusted with rapeseed oil. In contrast, the fat or oil compositions of Comparative Examples 1 to 7 showed unchanged or only slightly strong sweetness as compared to the sweetness of the oil-in-water type emulsion containing 6% (w/w) of sugar adjusted with rapeseed oil.

In addition, as apparent from Table 3, the use of the fat or oil composition of the present invention enhanced the sweetness of food.

The invention claimed is:

1. A fat or oil composition, comprising the following components (A), (B), and (C):
   (A) 0.10 mass % or more and 0.50 mass % or less of free α-linolenic acid;
   (B) 0.3 mass % or more and 1.0 mass % or less of monoacylglycerol comprising α-linolenic acid as its constituent fatty acid; and
   (C) 65 mass % or more of diacylglycerols,
   wherein a content mass ratio of the component (A) to the component (B), [(A)/(B)], is 0.10 or more and 1.00 or less.

2. The fat or oil composition according to claim 1, wherein a content of (A) free α-linolenic acid is 0.14 mass % or more and 0.50 mass % or less.

3. The fat or oil composition according to claim 1, wherein a content of (A) free α-linolenic acid is 0.17 mass % or more and 0.50 mass % or less.

4. The fat or oil composition according to claim 1, wherein a content of (B) monoacylglycerol comprising α-linolenic acid as its constituent fatty acid is 0.5 mass % or more and 1.0 mass % or less.

5. The fat or oil composition according to claim 1, wherein the content mass ratio of the component (A) to the component (B), [(A)/(B)], is 0.20 or more and 1.00 or less.

6. The fat or oil composition according to claim 1, wherein a content of (C) diacylglycerols is 65 mass % or more and 96 mass % or less.

7. The fat or oil composition according to claim 1, wherein a content of (C) diacylglycerols is 75 mass % or more and 94 mass % or less.

8. The fat or oil composition according to claim 1, wherein a content of α-linolenic acid in constituent fatty acids of a fat or oil is 40 mass % or more.

9. The fat or oil composition according to claim 1, wherein a content of α-linolenic acid in constituent fatty acids of a fat or oil is 45 mass % or more and 70 mass % or less.

10. The fat or oil composition according to claim 1, wherein a total content of unsaturated fatty acids in constituent fatty acids of a fat or oil is 55 mass % or more and 99 mass % or less.

11. The fat or oil composition according to claim 1, further comprising an antioxidant.

12. A fat or oil composition, comprising the following components (A), (B), and (C):
   (A) 0.14 mass % or more and 0.50 mass % or less of free α-linolenic acid;
   (B) 0.4 mass % or more and 1.0 mass % or less of monoacylglycerol comprising α-linolenic acid as its constituent fatty acid; and
   (C) 65 mass % or more of diacylglycerols,
   wherein a content mass ratio of the component (A) to the component (B), [(A)/(B)], is 0.10 or more and 1.00 or less.

13. The fat or oil composition according to claim 12, wherein a content of (A) free α-linolenic acid is 0.14 mass % or more and 0.42 mass % or less.

14. The fat or oil composition according to claim 12, wherein a content of (B) monoacylglycerol comprising α-linolenic acid as its constituent fatty acid is 0.5 mass % or more and 0.8 mass % or less.

15. The fat or oil composition according to claim 12, wherein the content mass ratio of the component (A) to the component (B), [(A)/(B)], is 0.20 or more and 0.80 or less.

16. The fat or oil composition according to claim 8, wherein a content of (C) diacylglycerols is 75 mass % or more and 94 mass % or less.

17. A method for enhancing a sweetness of a food or drink, the method comprising:
   applying the fat or oil composition of claim 1 to the food or drink.

* * * * *